United States Patent
Lythe et al.

[15] 3,640,518
[45] Feb. 8, 1972

[54] BASIC REFRACTORIES

[72] Inventors: Trevor Wilkinson Lythe, Worksop; Edward Arnold Ashworth, North Anston, both of England

[73] Assignee: Steetley (Mfg.) Ltd., Worksop, England

[22] Filed: Apr. 15, 1970

[21] Appl. No.: 28,977

[30] Foreign Application Priority Data

Apr. 18, 1969 Great Britain.....................20,015/69

[52] U.S. Cl.............................................263/52, 264/345
[51] Int. Cl.....................................................F27d 1/04
[58] Field of Search....................................263/52; 264/345

[56] References Cited

UNITED STATES PATENTS

| | | | |
|---|---|---|---|
| 3,061,451 | 10/1962 | Parker et al. | 264/345 X |
| 2,699,931 | 1/1955 | Buhler et al. | 263/52 |

*Primary Examiner*—John J. Camby
*Attorney*—Bacon & Thomas

[57] ABSTRACT

A basic refractory shape formed, for example, from dead-burned magnesia or dead-burned dolomite and having a high-carbon content is produced by heating a tar- or pitch-treated shape in the presence of vapors of a catalyst, such as an oxidation/polymerization agent, a polymerization/condensation agent or an inorganic oxidizing agent, and vapors of tar or pitch arising from the heating of the shape. The resulting shape can be fired to carbonize the tar or pitch. Impregnation with further quantities of tar or pitch subsequent to heating with the catalyst vapors is optionally effected before firing.

13 Claims, No Drawings

BASIC REFRACTORIES

FIELD OF INVENTION

The invention relates to a process for making improved basic refractory shapes and to the product thereof.

The advent of basic steelmaking processes using oxygen has demanded new and improved refractory lining materials for the vessels used in these processes. This has resulted in the development of tar- or pitch-impregnated fired basic bricks. The bricks are usually made from dead-burned dolomite (doloma) dead-burned magnesite (magnesia) or mixtures of the two materials. Specifically graded fractions of the materials are used with a transient bond which serves to make the brick or block suitable for handling after pressing usually to 8–10 tons/sq. in. The pressed bricks are subsequently dried at a temperature of 100°–300° C. for a period of 24 hours and then fired to a high temperature, usually in the range 1,400°–1,800° C., to develop a ceramic bond. If these bricks are impregnated after firing with tar or pitch so that all the open pores in the bricks are filled, then this type of brick gives a better performance in service in steel making vessels which come into contact with oxygen than that given by bricks which have not been impregnated with tar or pitch.

In service the tar or pitch carbonizes and the residual carbon has a beneficial effect by restricting the ingress of slag by both a physical and chemical action. By progressively increasing the residual carbon content of the brick, the attack by the slag produced in the steelmaking process, is progressively reduced, thereby increasing the service performance of the brick.

DESCRIPTION OF THE PRIOR ART

The normal method of impregnating fired basic refractories with tar or pitch is to heat the fired bricks to approximately 300° C. and then to transfer the hot bricks to a vacuum/pressure vessel and to remove the air in the bricks by evacuation. Tar or pitch preheated to a temperature such that its viscosity is suitable for impregnating the pores of the brick is then pumped into the evacuated vessel. Normally the viscosity must be less than that which produces a flow out time of 18 seconds through an S.T.P.T.C. 4 mm. tar viscometer cup, and preferably less than that which produces a flow out time of 12 seconds. The exact method is described in "Standard Methods of Testing Tar and Its Products" 6th Edition—1967 published by the Standardisation of Tar Products Tests Committee, Gomersall, Cleckheaton, Yorkshire. After 1–2 hours the vessel is pressurized for a short time to complete the impregnation. The pressure in the vessel is then returned to that of the atmosphere. The hot tar or pitch is then pumped out of the vessel and the impregnated bricks are removed and cooled and are then ready for building into the steel making vessel. This or any other method may be used to make the tar or pitch impregnated bricks or shapes used in the process of the invention which is described hereinafter.

Chemical additives, particularly oxidation/polymerization agents or polymerization/condensation agents, can be used to increase the carbon retention properties of tars or pitches. Unfortunately if added directly to the tar or pitch they increase its viscosity in the temperature ranges normally employed in the impregnation process i.e., 40°–200° C. so that their use becomes practically difficult.

SUMMARY

We have now discovered that by exposing tar- or pitch-treated shapes, such as tar- or pitch-impregnated bricks, to the vapor phase of a catalyst, a substantial increase in carbon retention after firing may be achieved.

According to the present invention there is provided a process for the production of a basic refractory shape which, when fired, has a high carbon content, which process comprises heating a tar- or pitch-treated shape in the presence of the vapors of a catalyst and vapors of tar or pitch arising from the heating of the tar- or pitch-treated shape. The shape so obtained is preferably allowed to cool before being fired.

THE PREFERRED EMBODIMENTS OF THIS INVENTION

The tar- or pitch-treated shape may be a tar- or pitch-impregnated shape or a tar- or pitch-bonded shape.

The basic refractory material from which the shape is made may be dead burned or fused magnesia, dead burned or fused lime or mixtures of these such as dead burned or fused dolomite. Dead-burned magnesia, dead-burned dolomite and mixtures thereof are especially preferred.

The firing step may form part of the process of the present invention or may take place during service when, for example, the shapes form part of a furnace structure. In the former case firing may be achieved by heating the shape in a reducing atmosphere, for example while embedded in carbon, to a temperature (usually in excess of 500° C.) such that the carbon content of the tar or pitch remaining after heating is greatly increased and very little volatile matter remains.

In the process of the present invention the heating of the tar- or pitch-treated shape involves some increase in carbon content of the tar or pitch and a decrease in the quantity of tar volatiles in the shape but does so on a significantly smaller scale than in firing. Desirably the tar- or pitch-treated shape is heated to a temperature in the range 150°–1,000° C.

The catalyst used in the process of the present invention is a material which, when mixed with tar or pitch, generally has the effect of increasing their viscosity. Such catalysts include organic material for example oxidation/polymerization agents or polymerization/condensation agents such as aromatic sulphonyl halides, aromatic and heterocyclic alcohols and aldehydes and aromatic nitrocompounds or compatible mixtures thereof. Typical aromatic nitrocompounds include nitrobenzene, m-dinitrobenzene, nitrotoluene, dinitrotoluene, trinitrotoluene and dinitronophthalene. The catalyst may also be an inorganic oxidizing agent such as ammonium persulphate, potassium permanganate, potassium dichromate or sodium nitrate. Certain salts are also effective, such as aluminum chloride, zinc chloride and ferric chloride.

The heating of the tar- or pitch-treated shape may be carried out in a closed oven or one with a closed circulation system. The catalyst may be injected into the oven as a vapor or as a liquid which is subsequently vaporized in the oven. The catalyst may also be placed in the oven in solid or liquid form along with the shapes and vaporized while in the oven.

In one embodiment of the invention treatment of the shape with vapors of the catalyst is carried out by placing the shape above the surface of a refluxing solution or suspension of the catalyst in tar or pitch.

In an improvement of the present invention it has been found that the carbon content after firing can be increased further if, after heating the tar- or pitch-treated shape in the presence of the catalyst vapors, the shape is impregnated, before or after cooling, with further quantities of tar or pitch. This increase is greater than would be anticipated.

The process of the present invention is not limited to one reimpregnation with tar or pitch provided that the shape is heated after each impregnation step. Accordingly the present invention also provides a process as described above wherein, after impregnation with further quantities of tar or pitch, the additional steps of heating and impregnating with tar or pitch are effected one or more times. The heating steps may be carried out in the presence of a vaporized catalyst. While it is desirable to carry out the first heating of the tar- or pitch-impregnated shape at a temperature in the range 150°–1,000° C., it is preferred to carry out a second heating step at a temperature of 175°–1,000° C. and a third heating step at a temperature in the range 400°–1,000° C.

The present invention also provides a process for the production of a basic refractory shape which, when fired has a high carbon content, which process comprises heating a tar- or pitch-impregnated shape or a tar- or pitch-bonded shape in the presence of the vapors of a catalyst and vapors of tar or pitch arising from the heating of the shape and thereafter cooling the shape.

The catalyst employed in this embodiment may be concentrated nitric acid, ammonium persulphate, p-toluene sulphonyl chloride, furfuryl aldehyde or m-dinitrobenzene and the tar- or pitch-impregnated or tar- or pitch-bonded shape is preferably formed from dead-burned magnesia, dead-burned dolomite or a mixture thereof. The shape may be fired after cooling.

Finally the present invention provides a basic refractory shape, such as a brick, when produced by the method described above.

Before giving examples of our invention it is pertinent to describe the method used to determine the carbon retention of tar- or pitch-treated bricks:

Samples cut from the treated brick are weighed (Wa) and then embedded in carbon granules contained in a chamber which can be sealed so as to obtain an atmosphere devoid of free air and oxygen. The chamber is heated by means of external silicon carbide heating elements. The samples are heated up to 800° C. at the following rate:

20°–200° C.; 220° C./hour
200°–500° C.; 100° C./hour
500°–800° C; 60° C./hour

When the samples attain a temperature of 800° C. the furnace is switched off and allowed to cool to room temperature. This is commonly referred to as "coking" and converts all the tar or pitch to carbon. The samples are removed, weighted (Wb) and then ignited at 1,000° C. to constant weight in an electrically heated furnace having an atmosphere containing free air and oxygen. The cooled carbon free samples are finally weighed (Wc).

% Carbon retained = (Wb−Wc)/Wb
% Total Tar or pitch in block = (Wa−Wc)/Wa

The invention will now be illustrated with reference to the following examples. In these examples the carbon retention after coking by the procedure described above must be compared with that of the standard block treated with tar or pitch only.

EXAMPLE 1

A series of fired magnesia bricks of the following chemical analysis was produced in the laboratory:

| CONSTITUENTS | WT. % |
| --- | --- |
| $SiO_2$ | 0.85 |
| $Al_2O_3$ | 0.21 |
| $Fe_2O_3$ | 0.15 |
| CaO | 1.60 |
| $TiO_2$ | 0.01 |
| $Mn_2O_3$ | 0.01 |
| $Cr_2O_3$ | 0.30 |
| $B_2O_3$ | 0.02 |
| MgO | 96.85 |

The apparent porosity, that is the volume of open pores available for impregnation by the pitch, was determined to be 16.0–16.2%.

These bricks were impregnated by the vacuum/pressure process hereinbefore described, with a pitch having the following properties:

| PROPERTY | VALUE |
| --- | --- |
| Melting Point (Ring and Ball) °C. | 93 |
| Specific Gravity at 15.5° C. | 1.30 |
| Insolubles (a) In Toluene Wt.% | 27.0 |
| (b) In Quinoline Wt.% | 5.5 |
| Ash Content Wt.% | 0.20 |
| Coking Value (Alcan Method) Wt.% | 52 |

After impregnation and cooling, the bricks were separately placed in refluxing vessels and the temperature raised to the range 110°–425° C. the temperatures being specifically selected for each of the agents under investigation. After refluxing for specific lengths of time the bricks were cooled and then "coked" in the manner previously described and their carbon retentions determined. The effect of these vapor phase treatments and the resultant retained carbon content of the bricks is shown in Table 1.

TABLE 1

| Vapor Phase Catalyst | | | Carbon Retention Wt. % | |
| --- | --- | --- | --- | --- |
| Agent | Reflux Temp. °C. | Reflux Time Hours | No Impregnation After Stoving | Reimpregnation of Stoved Bricks With Pitch |
| Nil | – | – | 2.7 | – |
| Meta Dinitrobenzene | 420–425 | 8 | 3.5 | 4.3 |
|  | | 12 | 3.6 | 4.5 |
| Nil | 420–425 | 8 | 3.2 | 3.8 |
|  | | 12 | 3.3 | 4.0 |
| Dinitrotoluene | 420–425 | 8 | 3.5 | 4.3 |
|  | | 12 | 3.7 | 4.6 |
| Meta Dinitrobenzene | 300–305 | 8 | 3.3 | 3.8 |
|  | | 12 | 3.6 | 4.0 |
| Nil | 300–305 | 8 | 3.0 | 3.3 |
|  | | 12 | 3.1 | 3.5 |
| Dinitrotoluene | 300–305 | 8 | 3.4 | 3.9 |
|  | | 12 | 3.6 | 4.1 |
| Furfuryl Aldehyde | 300–305 | 8 | 3.4 | 3.9 |
|  | | 12 | 3.6 | 4.1 |
| Furfuryl Aldehyde | 170–175 | 8 | 3.1 | 3.4 |
|  | | 12 | 3.4 | 3.6 |
| Nil | 170–175 | 8 | 2.7 | 2.7 |
|  | | 12 | 2.7 | 2.7 |
| Para Toluene Sulphonyl Chloride | 145–150 | 8 | 3.0 | 3.1 |
|  | | 12 | 3.0 | 3.3 |
| Nil | 145–150 | 8 | 2.7 | 2.7 |
|  | | 12 | 2.7 | 2.7 |
| Ammonium Persulphate | 110–115 | 8 | 3.0 | 3.2 |
|  | | 12 | 3.1 | 3.3 |
| Nil | 110–115 | 8 | 2.7 | 2.7 |
|  | | 12 | 2.7 | 2.7 |
| Nitric Acid | 120–125 | 4 | 3.0 | 3.3 |
|  | | 8 | 3.2 | 3.4 |

EXAMPLE 2

A series of fired magnesia bricks having the chemical analysis and apparent porosity quoted in Example 1 were produced in the laboratory. These bricks were impregnated by the vacuum/pressure process hereinbefore described with a tar having the following properties:

| PROPERTY | VALUE |
| --- | --- |
| Equiviscous Temperature (E.V.T.) °C. | 60 |
| Water Content Wt. % | Trace |
| Distillation Analysis | |
| a. Drip Temperature °C. | 215 |
| b. 20°–270° C. Fraction (Wt. %) | 1.1 |
| c. 270°–300° C. Fraction (Wt. %) | 3.4 |
| d. 300°–350° C. Fraction (Wt. %) | 5.5 |
| Phenolic Content | |
| a. 20°–270° C. Fraction (% v/w) | 0.16 |
| b. 270°–300° C. Fraction (% v/w) | 0.26 |
| c. 300°–350° C. Fraction (% v/w) | 0.25 |
| Naphthalene Content (Wt. %) | 0.24 |
| Coking Value (Alcan Method) wt.% | 42.0 |

After impregnation with tar the bricks were treated as described in Example 1 and the effects of the treatments on the resultant retained carbon content of the bricks is shown in Table 2.

TABLE 2

| Vapor Phase Catalyst | | | Carbon Retention | |
|---|---|---|---|---|
| Agent | Reflux Temp. °C. | Reflux Time Hours | No Impregnation After Stoving | Reimpregnation of Stoved Bricks With Tar |
| Nil | – | – | 1.5 | 1.5 |
| Meta Dinitrobenzene | 300–305 | 8 | 2.0 | 2.5 |
| | | 12 | 2.1 | 2.7 |
| Dinitrotoluene | 300–305 | 8 | 2.0 | 2.6 |
| | | 12 | 2.0 | 2.8 |
| Nil | 300–305 | 8 | 1.7 | 2.0 |
| | | 12 | 1.9 | 2.2 |
| Furfuryl Aldehyde | 170–175 | 8 | 1.8 | 2.1 |
| | | 12 | 1.8 | 2.4 |
| Nil | 170–175 | 8 | 1.6 | 1.8 |
| | | 12 | 1.7 | 2.0 |
| Ammonium Persulphate | 110–115 | 8 | 1.7 | 2.0 |
| | | 12 | 1.8 | 2.3 |
| Nil | 110–115 | 8 | 1.6 | 1.7 |
| | | 12 | 1.6 | 1.9 |

It should be noted that the process described is equally applicable to tar- or pitch-bonded basic materials i.e., products which have not been fired and impregnated but which are graded, mixed fractions of doloma and/or magnesia mixes pressed into shape with a tar or pitch bond. This is illustrated in Example 3.

EXAMPLE 3

Batches (60 1b.) of burned dolomite were crushed through a ⅜-inch B.S. mesh and graded as follows:

| B.S. Mesh | Wt. % |
|---|---|
| −3/8" +1/4" | 18 |
| −1/4" +3/16" | 12 |
| −3/16" +5 | 10 |
| −5 +7 | 10 |
| −7 +14 | 10 |
| −14 +25 | 10 |
| −25 +72 | 10 |
| −72 (Ball milled 0.27 m²/gm specific surface) | 20 |

Each batch was heated to a specific temperature before being fed into a preheated pan mill. The grain preheat temperature for pitch-bonded blocks was 200° C. and for tar bonded blocks was 120° C. The tar preheat temperature was 120° C. and the pitch preheat temperature was 180° C. The heated tar or pitch was added until the batch achieved the required consistency for hydraulic pressing and the batch mixed for 10 minutes. The hot batch was then pressed into four 9×4.5×3 inch (228×114×76 mm.) blocks at 8 t.p.s.i. (123.5 MN/m.²) on a hydraulic press. These blocks were stored at 300° C. in the presence of dinitrotoluene vapor. The effect of the vapor phase treatments on retained carbon content is illustrated in Table 3.

TABLE 3

| Bond Type Wt. % | Dinitrotoluene Vapor Wt. % | Tar Content Wt. % | C Retention After Stoving At 800° C. | 1,000° C. |
|---|---|---|---|---|
| EVT 60 | – | 5.0 | 3.1 | 1.2 |
| Tar 5% | 0.15 | 5.0 | 4.3 | 2.3 |
| | 0.30 | 5.0 | 4.4 | 2.4 |
| | 0.50 | 5.0 | 4.5 | 2.6 |
| | 0.80 | 5.0 | 4.5 | 2.7 |
| | – | 6.7 | 4.1 | 3.4 |
| Ring and Ball 80° C. Pitch 6.5% | 0.50 | 6.7 | 5.5 | 4.4 |
| | 0.80 | 6.7 | 5.6 | 4.5 |

We claim:
1. In a process for the production of a basic refractory shape which, when fired, has a high carbon content, wherein said shape has been treated with a member selected from the group consisting of tar and pitch, the improvement which comprises heating said treated shape in the presence of vapors of a catalyst and vapors of the member selected from the group consisting of tar and pitch arising from the heating of said treated shape.
2. The process of claim 1 wherein said treated shape is selected from the group consisting of a tar-impregnated shape, a pitch-impregnated shape, a tar-bonded shape and a pitch-bonded shape.
3. The process of claim 1 wherein the shape is subsequently fired in a reducing environment.
4. The process of claim 3 wherein the shape is fired while embedded in carbon.
5. The process of claim 1 wherein said treated shape is heated to a temperature of from 150° to 1,000° C. in an oven selected from the group consisting of a closed oven and an oven with a closed circulation system.
6. The process of claim 1 wherein the catalyst is selected from the group consisting of an oxidation/polymerization agent, a polymerization/condensation agent and an inorganic oxidizing agent.
7. The process of claim 1 wherein the catalyst is selected from the group consisting of an aromatic sulphonyl halide, an aromatic alcohol, an aromatic aldehyde, a heterocyclic alcohol, a heterocyclic aldehyde, an aromatic nitrocompound and mixtures thereof.
8. The process of claim 1 wherein the catalyst is selected from the group consisting of nitrobenzene, m-dinitrobenzene, nitrotoluene, dinitrotoluene, trinitrotoluene, dinitronaphthalene, ammonium persulphate, potassium permanganate, potassium dichromate, sodium nitrate, aluminum chloride, zinc chloride, ferric chloride, furfuryl aldehyde, p-toluene sulphonyl chloride and nitric acid.
9. The process of claim 1 wherein the treated shape is impregnated with a further quantity of a member selected from the group consisting of tar and pitch after being heated in the presence of catalyst vapors.
10. The process of claim 9 wherein, after impregnation with a further quantity of a member selected from the group consisting of tar and pitch, the additional steps of heating and impregnating with a member selected from the group consisting of tar and pitch are effected at least one more time.
11. In a process for the production of a basic refractory shape which, when fired, has a high carbon content and wherein said shape is selected from the group consisting of a tar-impregnated shape, a pitch-impregnated shape, a tar-bonded shape and a pitch-bonded shape the improvement which comprises heating said shape in the presence of vapors of a catalyst and vapors of a member selected from the group consisting of tar and pitch arising from the heating of said shape and thereafter cooling the shape.
12. The process of claim 11 wherein the shape is fired after being cooled.
13. The process of claim 11 wherein the catalyst is selected from the group consisting of concentrated nitric acid, ammonium persulphate, p-toluene sulphonyl chloride, furfuryl aldehyde, m-dinitrobenzene and mixtures thereof.

* * * * *